INVENTOR.
ROSS E. MORRIS

INVENTOR.
ROSS E. MORRIS 3,385,396
FLUID TRANSMITTED NOISE FILTER APPARATUS UTILIZING RESILIENT FILTER ELEMENTS
Ross E. Morris, Vallejo, Calif., assignor to the United States of America as represented by the Secretary of the Navy
Filed Jan. 25, 1966, Ser. No. 522,991
6 Claims. (Cl. 181—47)

The present invention relates to a fluid transmitted noise filter apparatus that is used to damp noise and vibrations in pipe line systems.

It is often times desirable to eliminate noises and vibrations in pipe line systems. There are available filters which permit dampening of oscillations caused by pumping machinery and similar apparatus in the system. For instance, it is well known to provide a rubber sleeve connecting two sections of piping. The disadvantage of this pipe filter is that it is not able to withstand high pressures or fluctuating pressures which are often present in fluid transmitting systems. If it were attempted to reinforce the rubber sleeve, such as reinforcing would result in the sleeve itself transmitting the undesirable sound in pipe line system. Another disadvantage of known acoustic filters is that the known filters are manufactured so as to eliminate only a single frequency or single range of frequencies. A further undesirable feature of existing systems is that many normally operate in a relatively low pressure range when modified for high pressures, a bulky impractical apparatus results.

Therefore, it is an object of the invention to provide a fluid transmitted noise filter apparatus which substantially eliminates acoustic disturbances in piping systems.

Another object of the invention is to provide a fluid transmitted noise filter apparatus operable in that 0–1000 p.s.i.g. range.

A further object is to provide a fluid transmitted noise filter apparatus having easily replaceable resilient filter elements.

Another object of the invention is to provide a fluid transmitted noise filter apparatus having selectively tuneable filter elements thereby permitting dampening of discrete frequencies or discrete frequency ranges.

Another object of the invention is to provide a fluid transmitted noise filter apparatus operable in unidirectional or bidirectional flow.

Another object of the invention is to provide fluid transmitted noise filter apparatus which is compact and specially adapted for use in submarines.

The instant invention is directed to a compact fluid transmitted noise filter apparatus wherein replaceable resilient filter elements are tuneable to particular frequencies thereby eliminating the particular frequencies from the pipe line system.

A full understanding of the invention and of its further objects and advantages may be obtained from the following description of certain illustrative embodiments and the attached drawings wherein.

Figure 1:
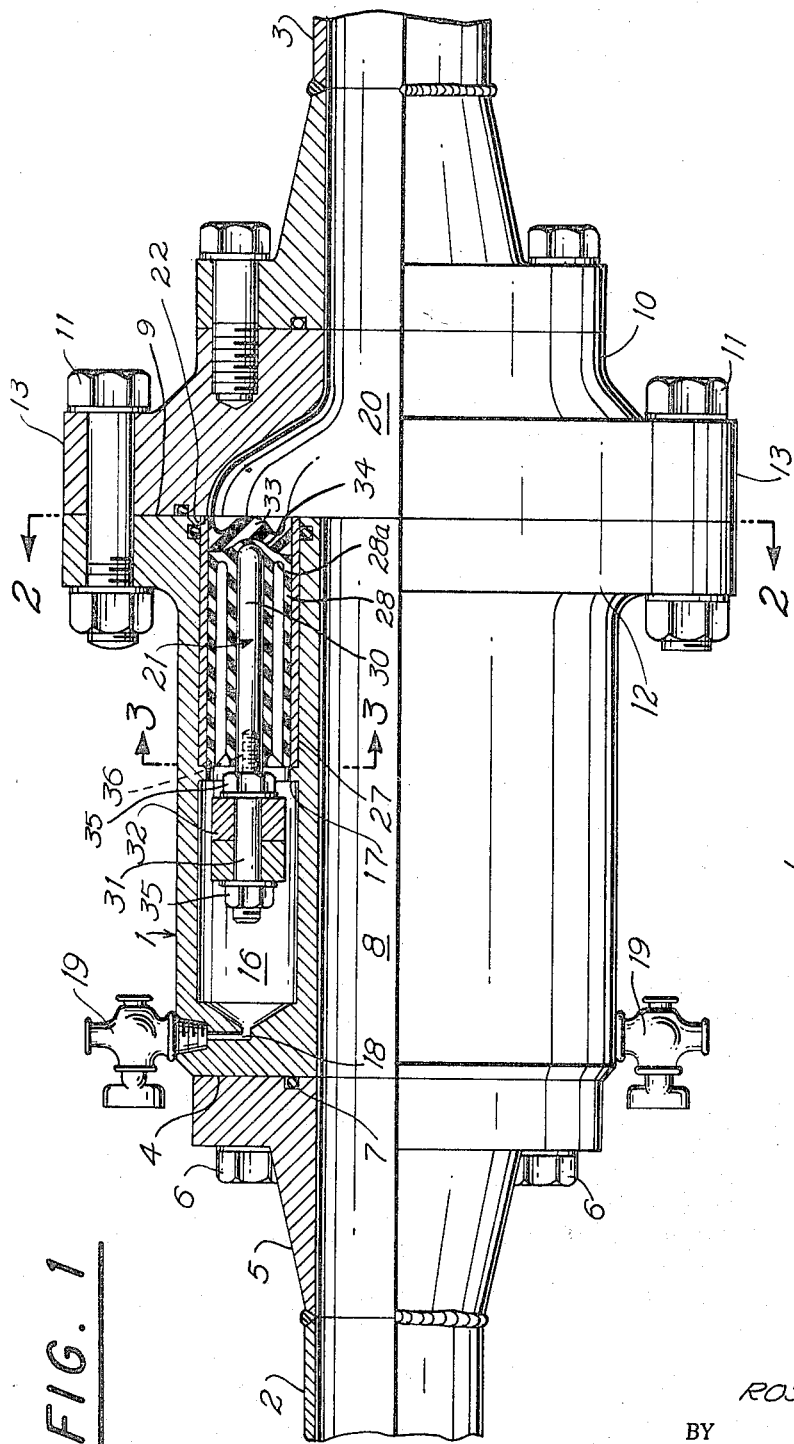
FIG. 1 is a center section of the fluid transmitted noise filter apparatus of the invention showing the apparatus installed in a pipe line.
Figure 5:
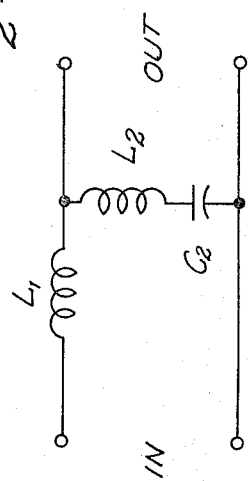
Figure 2:
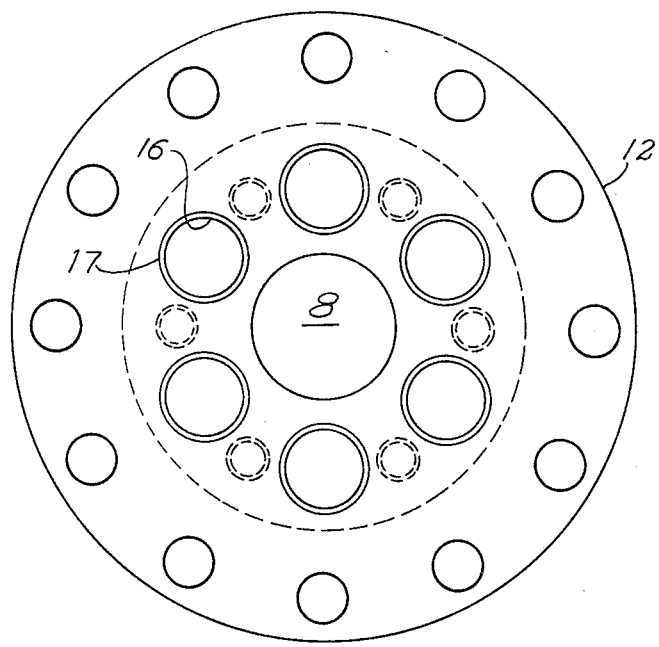
FIG. 2 is an end view of the filter apparatus taken along lines 2—2 in FIG. 1.
Figure 3:
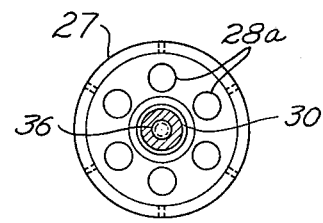
FIG. 3 is an end view of a particular noise filter element taken along lines 3—3 in FIG. 1.

FIG. 5 an electric analog at a low pass filter.

The theory of operation of the disclosed fluid transmitted noise filter will be understood by showing an acoustical counterpart of an electrical low-constant, low-pass filter where the fluid in a prescribed length of pipe acts as a series impedance and the spring elements of the filter act as shunt compliances. Referring to FIG. 5, which as stated, illustrates the electrical analog of a low pass filter, the term $L_1$ is a series inductance, $L_2$ is a shunt inductance and $C_2$ a shunt capacitance.

The acoustical counterparts of the electrical elements are shown below:

Electrical: Acoustical
$L_1$ ---- $wl_1/gs$
$L_2$ ---- $W_t/gs_1^2$
$C_2$ ---- $s_1^2/K$ where $w$ = density of fluid in pipe line.
$s$ = cross sectional area of pipe line.
$s_1$ = cross sectional area of filter element.
$l_1$ = distance from noise source to filter elements.
$W_t$ = total weight appended to each filter element.
$g$ = 386 inches per second per second (32 ft./sec.$^2$).
$K$ = spring constant of filter element.

Three design parameters are given for this type of filter, any two of which may be specified. These parameters are cutoff frequency, $f_c$, frequency of maximum attenuation, $f_r$, and a minimum attenuation above $f_r$, A (henceforth referred to as the attenuation). In electrical theory, values for attenuation in terms of decibels may be obtained from the following relation.

$$A(db) = 20 \log_{10} \frac{L_1 + L_2}{L_2}$$

The acoustical counterpart of the preceding relation is a function of the number of filter elements, N, used at a given location in the pipe line and is shown below:

$$A(db) = 20 \log_{10} \left(1 + \frac{ws_1^2}{s} \times \frac{l_1}{W_t} \times N\right)$$

In a particular acoustic filter several variables can be fixed by reason of the physical dimensions and locations of the filter i.e., $W_{s1}$, and $sl_1$ would all have a constant value whereas N and $W_t$ would be the quantities which determine the minimum attenuation A. When $W_t$ is constant, then the determinative factor as to the filter efficiency as determined by A would be determined only for different values of N.

By varying the number of filter elements N in a particular acoustic filter it was found that the efficiency determined by A was Number of filter elements: Attenuation, (db)
1 ---- 6
2 ---- 10
3 ---- 12
4 ---- 14
5 ---- 16
6 ---- 17

Therefore, in a fluid transmitted filter apparatus having six resilient filter elements, a failure of one or two filter elements would mean a reduction in efficiency from 17 db to 16 decibel to 14 decibel, respectively. The overall reduction is small in an absolute sense.

Here it should be mentioned that in order for a lumped parameter theory to be valid, $l_1$ should not be less than approximately $5d_1$ or greater than approximately $50d_1$, where $d_1$ is the inside diameter of the pipe line.

It should be remembered that A represents a minimum attenuation at all frequencies above resonance. Maximum attenuation coincides with the resonant frequency. Attenuation is related to the cut-off frequency and the resonant frequency by the relation:

$$A(db) = 40 \log_{10} \frac{f_r}{f_o}$$

It will be noted that the higher the value for A at any given resonant frequency the lower will be the cut-off frequency. Also for a given value of A the cut-off frequency drops in direct proportion to the resonant frequency. However, when determining the value for A, the design requirements imposed by $l_1$ must be taken into consideration.

The filter element required in the above formuli is formed of a rigid tubular member filled with a resilient tubular element, the filter element having an access end of its resilient element in communication with the fluid in the piping. The filter element inner end must be allowed to freely vibrate. The resilient element thereby absorbs or dampens fluid-borne sound by resonating at a particular frequency or range of frequencies, and by so resonating, a mechanical impedance to sound transmission is created by the resilient element.

In the present invention the filter element must withstand pressures of 0 to 1000 p.s.i.g. and dampen fluid transmitted frequencies in the 20 to 400 c.p.s. range. Therefore, in the present invention the resilient element which, for example, may be natural rubber, is adherently bonded to the inner wall of the rigid tubular member thereby providing a strong connection that withstands pressures in the 0 to 1000 p.s.i.g. range. Also since it has been found that certain fluids transmitted in a piping system may have a deteriorating volatile effect on the natural rubber resilient element, a sealing means, for example nitrite rubber, may be adhered onto the access end of the resilient element.

Most suitably, a plurality of such filter elements mass produced are tuned to a particular frequency or range of frequencies and in this regard, it has been discovered that the resonant frequency of each element can be changed by varying the mass of the resilient element. The apparent mass of the resilient element can be changed by adhering a weight to the inner end of the resilient element. Therefore, by adherently bonding a rigid shaft to the inner surface of the resilient element which projects past the said resilient element, the apparent mass could be changed by rigidly mounting varying weights on the projecting portion of the shaft.

Referring to the drawings the present apparatus includes a fluid transmitted noise filter housing 1 interposed between two sections of piping 2 and 3 which are of equal cross sectional area. Filter housing 1 is provided with an end wall 4 which abuts a flanged connecting section 5 of piping section 2 and secures the filter housing to piping 2 by means of a plurality of circumferentially equally spaced bolts 6 inserted into correspondingly spaced tapped wells in wall 4. A well known sealing means 7, for instance an O-ring seal, insures a watertight connection between the flanged section and the end well. Housing 1 is formed with a main bore 8 that is sized for coaxial alignment with piping sections 2 and 3.

Housing 1 also is provided with six circumferentially spaced, cylindrical cavities 16 bored radially outwardly of and axially parallel to main bore 8. The outer end of each cavity communicates with a bell shaped conduit 20 in a manner described below, and is in a coplanar relationship with a filter housing wall 9. Housing 1 is further provided with a flange 12 extending radially outwardly of a housing wall 9.

An essentially cone shaped adapter 10 encloses bell shaped conduit 20 and extends a radially outwardly extending flange 13. Adapter 10 is connected to housing 1 by a plurality of bolts 11 inserted through corresponding holes in flanges 12 and 13 whereby a larger end of conduit 20 permits fluid communication between cavities 16 and main bore 8. The adapter further is provided with an inner shoulder 22 which blocks off a small portion of the cavities from the main bore thereby acting as a securing means for special filter elements 21 as will be explained. Adapter 10 is connected and sealed to piping section 3 in an identical manner as described for the interconnection of piping section 2 and housing 1 above, it being understood that a smaller end of bell shaped conduit 20 and the cross sectional area of piping 3 are of identical area and coaxially aligned.

Cylindrical cavities 16 each are provided with an abutting shoulder 17 extending radially inwardly of the cavities. Each cavity or bore 16 is additionally provided with a duct 18 leading to the outside of housing 1 through an on-off valve 19.

Within each cavity 16 the previously-mentioned filter element 21 is inserted abutting shoulder 17 whereby the filter's outer end maintains a flush relationship with housing wall 9 and is in fluid communication with the main bore via bell shaped conduit 20. An O-shaped seal cooperating with the outer end of filter element 21 seals the access end of the cylindrical cavities. Here it should be noted that inner shoulder 22 overlaps a small portion of the inserted filter elements thereby securing same within the cavities 16.

Noise filter element 21 is formed of a rigid tubular member 27 which may be formed from copper nickel tubing although other suitable materials could be substituted. Within the greater part of tubular member 27 resilient tubular member 28 is adhered by bonding to the inner walls of member 27. Preferably, resilient tubular member 28 is formed of natural rubber because its properties are relatively constant with variations in temperature. By molding a plurality of elongate holes 28a internal stresses created by the bonding process of member 28 are reduced.

Adhered to an inner wall of member 28 is rigid shaft 30 having a projecting portion 31 which projects outside of rigid tubular member 27 and inwardly of cavity 16. Shaft 30 is formed of some rigid material, such as steel, to transmit vibrations from the resilient member 28 to the weights 32 that are mounted on projecting portion 31 of shaft 30.

When certain volatile fluids, which could react with resilient member 28, are being transmitted in the system, it becomes necessary to provide a sealing element 33 across the access end of rigid tubular member 27. Because of its physical strength and oil resistance, a preferred material to be used as a seal member is nitrile rubber although it is understood that other suitable materials could be used. At the access end of filter element 21 sealing member 33 is adhered to the inner walls of rigid tubular member 27 and an outward end 34 of resilient member 28 thereby providing a protective wall for resilient member 28.

Projecting portion 31 of shaft 30 may be integrally formed with shaft 30 or, in its preferred form, may be a separate element. As a separate element projecting portion 31 could be joined to shaft 30 by screwing a threaded extension 36 into a matching tapped hole in rigid shaft 30. The advantages of having rigid shaft 30 so separable will be explained below.

Weights 32 mounted on projecting portion 31 are securely held in place by bolts 35. Abutting shoulder 17 so positions filter element 21 that the projecting portion mounting the weights are in a suspended relationship with respect to the inner walls of the cylindrical cavity 16.

When the access end of a filter element 21 is in fluid communication with the fluid transmitted in the piping and the weight supporting end of the filter element is free to vibrate, dampening of troublesome acoustic frequencies will result. Therefore, the disclosed fluid transmitted noise filter apparatus may be interposed between two sections of piping to eliminate fluid borne noises in a unidirectional flow or a bi-directional flow within the pipe. That is to say, fluid within the piping that carries vibrations from distant pumping machinery or similar apparatus, flows through bore 8 of the filter housing. Conduit 20 permits the fluid in the pipe to communicate with six filter elements 21. The dampening effect on certain frequencies by the filter element is such that certain frequencies transmitted within the fluid can be dampened or substantially eliminated from a system. Selective tuning of the filter elements, that is tuning to a particularly troublesome frequency or range of frequency is achieved by varying weights 32 on the projecting portions of the rigid shafts 30, for the resonant frequency of disclosed filter elements can be varied by changing the mass of the filter element.

In piping systems, like those found in submarines optimum acoustic filter efficiency is required thereby necessitating frequency inspection of the filters. In the instant invention the filter housing 1 is easily removed by unbolting filter housing from section 5 and the adapter 10. A visual inspection of filter elements 21 will then show which elements have to be replaced by reason of fatigue or wear. Filter element 21 is removed from the cylindrical cavity by applying a liquid or air pressure to the output of off-on valve 19 and thereby expelling the element from the cavity. After expulsion of the element from the cavity, projecting portion 31, mounting thereon weights 32, may be removed from rigid shaft 30. Said projecting portion 31 may then be moved from rigid shaft 30 in the worn out filter element 21 by unscrewing threaded extension 36. Said projecting portion is then rigidly secured to an identical rigid shaft 30 in a new filter element thereby resulting in a new filter element which is tuned to an identical frequency as the old discarded element. The new filter element can then be re-inserted in cylindrical cavity 16. If it is desired to tune a filter element to a different frequency, remove the filter element in the same way as explained for a worn out filter element and add or remove weights to the shaft 31.

Here it should be noted that the resonant frequency of the disclosed filter elements was found to remain substantially unchanged in the 0 to 600 p.s.i.g. range. In the 0 to 1000 p.s.i.g. range there was a gradual increase in resonant frequency of about 10%.

Figure 4:
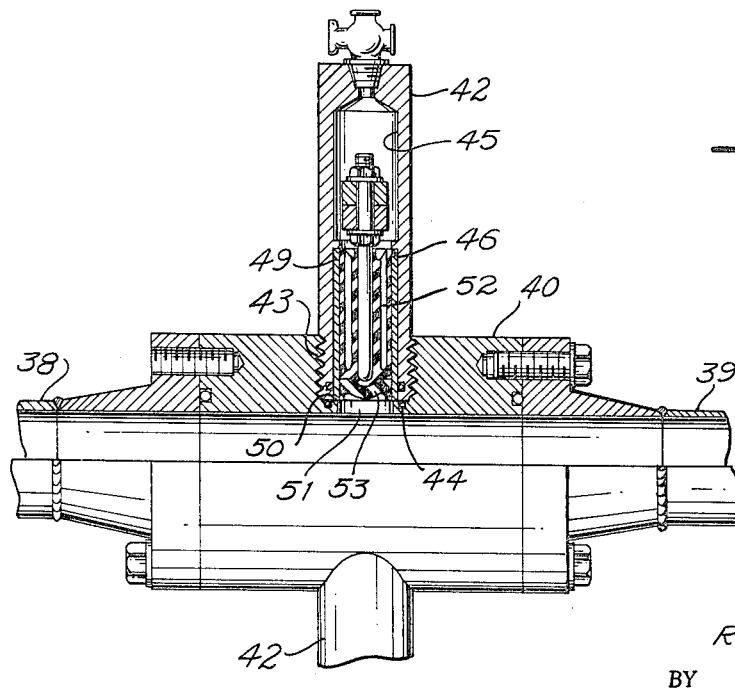
FIG. 4 shows another embodiment of the disclosed invention.

FIG. 4 shows another embodiment of the present invention in which filter housing 40 is interposed between piping sections 38 and 39 and secured thereto by suitable means. Housing extensions 42 are threadedly mounted within filter housing 40, as indicated at 43. Sealing means 44 which may be of the O ring type provides a fluid tight connection between housing extension 42 and filter housing 40. Housing extension 42 is provided with a cylindrical cavity 45 having a retaining shoulder 46 projecting radially inwardly of the cavity. Mounted within cylindrical cavity 45 replaceable filter element 21 is positioned with its inner end abutting retaining shoulder 46. At the access end of filter element 21 rigid tubular member 49 is secured within cavity 45 by circumferential lip 50 located circumferentially around access duct 51. Resilient element 52 or, if volatile fluids are transmitted, seal element 53 substantially coincides with the cross sectional area of access duct 51.

To inspect the filter elements in the embodiment of FIG. 4 merely unscrew housing extension 42 from filter housing 40. A filter element 21 would be removed in a manner similar to that set forth in the first embodiment above. Therefore, the present embodiment would have the same advantages as the first embodiment that is, easy access to the filter elements, selective tuning of the respective filter elements, and compactness and simplicity in design. The invention is being especially applicable to systems where a minimum of noise is permitted, for example, in submarine piping systems.

Obvious modifications may be made in the disclosed system without departing from the spirit or scope of the invention as set forth herein and claimed.

What is claimed is:

1. Fluid-transmitted noise filter apparatus for interconnecting two coaxial sections of piping comprising;
    a filter housing provided with a main bore sized for alignment with the bores of said two piping sections, a cylindrical cavity in fluid communication with the main bore, and further provided with a valve interposed in a duct that joins said cylindrical cavity and the filter housing exterior, and
    a replaceable noise filter element sealably mounted in said cylindrical cavity, said filter element including;
    a rigid tubular member,
    a resilient tubular member having its outer surface adhered to the inner surface of said rigid tubular member,
    a rigid shaft adhered to the inner surface of the resilient tubular member and having a projecting portion projecting outwardly of the resilient member into a freely-movable position within said cylindrical cavity, and
    a weight removably mounted on said projecting portion, said filter housing further being provided with means for fixedly positioning said rigid tubular member within said cylindrical cavity whereby said shaft is free to vibrate with respect to said rigid member.

2. Apparatus according to claim 1 further including;
    a plurality of cylindrical cavities spaced on said main bore, and
    a plurality of replaceable filter elements sealably mounted one in each of said cylindrical cavities.

3. Apparatus according to claim 1 wherein the resilient tubular member is provided with a plurality of elongate holes for relieving stresses within said resilient tubular member.

4. Apparatus according to claim 1 wherein the projecting portion of said shaft is detachably coupled to the adhered portion of the shaft whereby, upon removal of the filter element from said cavity, said projecting portion mounting a particular weight is transferable from one replaceable filter element to a second replaceable filter element thereby resulting in substantially identically tuned replaceable filter elements.

5. Apparatus according to claim 1 further including; means resiliently sealing the access end of said filter element, said means being adhered to said resilient and rigid members.

6. Apparatus according to claim 2 wherein said plurality of cylindrical cavities is circumferentially spaced radially outwardly of and axially parallel to said main bore, said apparatus further including;
    an adapter coupling one end of said housing to a section of piping, said adapter being shaped internally as a radially enlarged symmetrical conduit for directly communicating the access opening of said cavities with the fluid of said piping.

References Cited

UNITED STATES PATENTS 2,297,046   9/1942   Bourne _____ 181—64
3,237,715   3/1966   Peters _____ 181—47

ROBERT S. WARD, JR., *Primary Examiner.*